United States Patent
Vu (10) Patent No.: US 11,327,671 B2
(45) Date of Patent: May 10, 2022

(54) ERROR IDENTIFICATION IN MEMORY AND DISK ALLOCATION LAYOUTS

(71) Applicant: Two Six Labs, LLC, Arlington, VA (US)

(72) Inventor: Huy Vu, Arlington, VA (US)

(73) Assignee: Two Six Labs, LLC, Arlington, VA (US)

( * ) Notice: Subject to any disclaimer, the term of this patent is extended or adjusted under 35 U.S.C. 154(b) by 28 days.

(21) Appl. No.: 16/518,056

(22) Filed: Jul. 22, 2019

(65) Prior Publication Data

US 2021/0026533 A1 Jan. 28, 2021

(51) Int. Cl.
| | |
|---|---|
| *G06F 3/00* | (2006.01) |
| *G06F 3/06* | (2006.01) |
| *G06F 11/07* | (2006.01) |
| *G06F 11/32* | (2006.01) |
| *G06F 11/34* | (2006.01) |

(52) U.S. Cl.
CPC ............ *G06F 3/064* (2013.01); *G06F 3/0617* (2013.01); *G06F 3/0631* (2013.01); *G06F 3/0653* (2013.01); *G06F 3/0673* (2013.01); *G06F 11/0757* (2013.01); *G06F 11/323* (2013.01); *G06F 11/3476* (2013.01)

(58) Field of Classification Search
CPC ...... G06F 3/064; G06F 3/0653; G06F 3/0631; G06F 3/0673; G06F 3/0617; G06F 11/0757; G06F 11/323; G06F 11/3476
See application file for complete search history.

(56) References Cited

U.S. PATENT DOCUMENTS

| | | | | | |
|---|---|---|---|---|---|
| 6,226,095 | B1* | 5/2001 | Fukuta | ................... | G06K 15/00 358/1.13 |
| 6,718,485 | B1* | 4/2004 | Reiser | ................. | G06F 11/3466 712/227 |
| 9,760,464 | B1* | 9/2017 | Helliwell | .............. | G06F 11/073 |
| 2005/0144410 | A1* | 6/2005 | Swafford | ............ | G06F 11/3471 711/170 |
| 2011/0022893 | A1* | 1/2011 | Yang | ................... | G06F 11/3608 714/33 |
| 2011/0307828 | A1* | 12/2011 | Chilimbi | ............. | G06F 11/3476 715/802 |
| 2013/0275656 | A1* | 10/2013 | Talagala | .............. | G06F 12/0246 711/103 |

\* cited by examiner

*Primary Examiner* — Craig S Goldschmidt
(74) *Attorney, Agent, or Firm* — Armis IP Law, LLC (57) ABSTRACT

One example method of operation may include identifying event block allocations of one or more of data memory and data storage allocations, assigning indicators to the event block allocations based one or more determined statuses associated with the event block allocations, populating a display interface with the event block allocations and the indicators, performing a trace event of the event block allocations, identifying a target event block allocation among the event block allocations, and creating a notification identifying an allocation violation based on the identified target event block allocation.

22 Claims, 9 Drawing Sheets

ERROR IDENTIFICATION IN MEMORY AND DISK ALLOCATION LAYOUTS

FIELD OF THE INVENTION

The present invention generally relates to disk and/or memory layouts in a computing device, and more particularly, to techniques which provide optimized identification of bugs or irregular layouts which require correction.

BACKGROUND OF THE INVENTION

Conventional memory and storage disk allocations are performed in an automated manner by a computer or related computing device, such as a personal computer, server, laptop, smartphone, wearable computer, etc. The challenges with memory and/or disk layouts begin with the large and complex volumes of data being allocated for certain disk management tools and memory tools. Certain applications, when loaded, may require a certain amount of memory prior to being used. Also, certain operating systems may allocate large volumes of disk space for certain software programs which are installed on the computing device(s). In order to prepare for certain allocation issues and computer performance measures with those implementations, a detailed analysis of the actual data may be required. The analysis of those allocation methods can require large amounts of human analysis time, moreover, the user submitted changes could have significant impacts on the memory or disk layout over time. In order to analyze a potential bug, such as memory corruption or disk allocation errors, resulting from a disk or memory corruption event, millions of transactions must be pieced-together and understood at each step of the allocation process. The number of applications and allocations may cause additional analysis depending on the actions of the computer being analyzed.

In general, memory and disks are allocated in "blocks" of various sizes, as the operating system requires more memory and/or disk space, more memory blocks and/or disk blocks are continuously allocated. Over an extended period of time, the blocks are arranged in seemingly random locations. Tools, such as a defragmenter operate by attempting to make the overall system more efficient by moving the blocks around in an attempt to construct a more contiguous order of blocks. This approach should increase the performance in accessing a file in a disk or a memory object by having the blocks right next to each other, which avoids sifting through empty blocks which are of no relevance. Even a snapshot in time of the layout of the "blocks" contains enormous amounts of data (i.e., hundreds of thousands to millions of entries). This complexity is compounded by the state changes at every "block", which may be required to understand whether there is a cyber security 'bug', such as memory corruption. For example, if a block is already being used, and a bug exists in the software application operating on the computer, then the newly allocated block could be overlapped with the previously allocated blocks to create a data or memory corruption.

Bugs and other potential failures for memory and disk allocations require faster and easier tools to identify such failures so the errors can be corrected by accurate location measures and/or automated tools which can identify the errors and correct them autonomously based on the application of fundamental analysis criteria.

SUMMARY

Example embodiments provide a method, device, system, non-transitory computer readable storage medium with a processor to perform operations, which may optimize a disk and/or memory allocation scheme while reducing unnecessary computer memory usage, processing, and disk space along with bandwidth over a network to achieve optimum results.

More specifically, the present application provides mechanisms and techniques that may include a method of operation that provides identifying event block allocations of one or more of data memory and data storage allocations, assigning indicators to the event block allocations based one or more determined statuses associated with the event block allocations, performing a trace event of the event block allocations, populating a display interface with the event block allocations and indicators, identifying a target event block allocation among the event block allocations, and creating a notification identifying an allocation violation based on the identified target event block allocation.

Another example embodiment may include an apparatus that includes a processor configured to identify event block allocations of one or more of data memory and data storage allocations, assign indicators to the event block allocations based one or more statuses associated with the event block allocations, populate a display interface with the event block allocations and the assigned indicators, identify a target event block allocation among the event block allocations, and a transmitter configured to transmit a notification identifying an allocation violation based on the identified target event block allocation to an administrator device.

Still another example embodiment may include a non-transitory computer readable storage medium configured to store instructions that when executed cause a processor to perform identifying event block allocations of one or more of data memory and data storage allocations, assigning indicators to the event block allocations based one or more statuses associated with the event block allocations, populating a display interface with the event block allocations and the assigned indicators, identifying a target event block allocation among the event block allocations, and creating a notification identifying an allocation violation based on the identified target event block allocation.

Other embodiments include a computer system configured as a management station to perform all of the aforementioned methods via software control, or via hardware and/or software configured to perform those methods and the techniques disclosed herein as the invention.

Other embodiments of the invention that are disclosed herein include software programs to perform the operations summarized above and disclosed in detail below. More particularly, a computer program product is disclosed which has a computer-readable medium including computer program logic encoded thereon to provide methods for computer resource allocation and error detection and correction.

The computer program logic, when executed on at least one processor within a computing system, causes the processor to perform the operations (e.g., the method embodiments above, and described in detail later) indicated herein. This arrangement of the invention is typically provided as software on a computer readable medium such as an optical medium (e.g., CD-ROM), floppy or hard disk or other such medium such as firmware in one or more ROM or RAM or PROM chips or as an Application Specific Integrated Circuit (ASIC). The software or firmware or other such configurations can be installed onto a computer system to cause the computer system to perform the techniques explained herein as the invention.

It is to be understood that the system of the invention can be embodied strictly as a software program, as software and hardware, or as hardware alone. Is also to be understood that the allocation analysis scheme of this invention typically performs (e.g., executes, runs, or is otherwise operated) on a server or computing device coupled to a data storage or other type of network. The server performing the allocation analysis is generally networked but is typically a dedicated computer system, personal computer or workstation operated by a network or systems administrator or manager. In alternative arrangements however, the processing node of this invention may reside on a computer system located elsewhere on the network and the user (e.g., systems manager) that provides such services may be located elsewhere on the network and may be communicating with the server over a network connection (e.g., WWW or other browser-type interface, command-line interface, messaging interface, E-Mail, or another protocol or interface). The server may operate as a virtual machine in a cloud computing network.

An example implementation of the invention that incorporates certain of the aforementioned embodiments is the computer allocation management software application manufactured by TWOSIX Corporation of Arlington, Va.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

The present invention provides techniques and mechanisms to configure a server or other computing node(s) to monitor its own computing environment or another computing node via a remote connection. The process includes auditing the allocation events for memory (i.e., RAM) and/or storage (i.e., hard disk) block allocations to create a visualization in a user interface that demonstrates the block allocations over time. The interface may include various events which are populated into the interface based on the data identified from an allocation log file. The allocations are arranged by address, time, date, etc., and are thus illustrated in a manner that will demonstrate violations, such as overlapped allocations and 'double free' events, where a memory space is called 'free' more than once, which permits future allocation errors.

Bugs which may occur involuntarily and may cause memory/disk allocation violations. This may also be caused by intentional cyber-attacks, malware, viruses and other intentional software manipulation acts. For the purposes of an "offensive" cyber network operations (CNO) use case, the example embodiments can be used to visualize the impact of automated and/or "user" input as a function of memory/disk layout. The example methods described may increase the efficiency of the CNO analysis by several orders of magnitude. For example, by visually producing the memory/disk block allocation events as a function of user input, an ideal state can be reached and iteratively changed until the ideal memory layout is achieved.

According to example embodiment, an instrumentation log file can be generated to identify allocations in plain text. The allocations have addresses, sizes, ordered information (e.g., date/time), etc., regarding where the memory allocations 'malloc' calls are made, and also where the memory is free via identified (free ( ) call) information. Collecting such information can be performed by a number of ways by what is called 'instrumented data', which can be collected by many commercial computing tools known to those skilled in the art.

Throughout the disclosure, the examples of block allocation events may refer to memory allocations performed responsive to a computing decision, such as allocating memory to an application or process. Other examples of block allocation events may include hard disk allocation, such as a partition or other disk segment that is assigned to a file(s), application and/or process. For simplicity, the following examples may refer to storage or memory without having referring to other types of block allocations. Contents of a sample input file of memory allocations are included below, starting at a particular line of a block allocation file, (i.e., line 89):

89 free (0x101edc000)=0
90 malloc(0x7bff8)=0x101e60000 #0x101e60000
91 malloc(0x7bfa3)=0x101edc000 #0x101edc000
92 malloc(0x7bfa1)=0x10499c000 #0x10499c000
93 free (0x145906300)=0
94 free (0x101e60000)=0
95 free (0x101edc000)=0
96 malloc(0x4ff80)=0x101e60000 #0x101e60000
97 malloc(0x4ff2b)=0x101eb0000 #0x101eb0000
98 malloc(0x4ff29)=0x101f00000 #0x101f00000
99 free (0x145906300)=0
100 free (0x101e60000)=0
101 free (0x101eb0000)=0
102 malloc(0xfff8)=0x101e60000 #0x101e60000
103 malloc(0xffa3)=0x101e70000 #0x101e70000
104 malloc(0xffa1)=0x101e80000 #0x101e80000
105 free (0x145906300)=0
106 free (0x101e60000)=0
107 free (0x101e70000)=0

```
108 malloc(0x65fb8)=0x101e90000 #0x101e90000
109 malloc(0x65f67)=0x104a18000 #0x104a18000
110 malloc(0x65f65)=0x104a80000 #0x101e80000
111 free (0x145906300)=0
112 free (0x101e90000)=0
113 free (0x104a18000)=0
114 malloc(0x7bff8)=0x104ae8000 #0x104ae8000
115 malloc(0x7bfa3)=0x104b64000 #0x104b64000
116 malloc(0x7bfa1)=0x104be0000 #0x104be0000
117 free (0x145906990)=0
118 free (0x104ae8000)=0
119 free (0x104b64000)=0
120 malloc(0x7bff8)=0x104ae8000 #0x104ae8000
121 malloc(0x7bfa3)=0x104b64000 #0x104b64000.
```

As may be observed from the contents of the sample input file, the lines of the input file identify different memory allocations and/or free memory spaces which can be allocated for new allocations. As the input file contents are populated into a display interface that orders the allocations by address, allocation size, and time, the allocations and free spaces can then be used to identify violations and potential availability for re-allocations. For example, a free event call may designate a memory free, a next free event on the same memory may be readily identified by a marker/flag placed in the first free event and a second marker placed in the next free event. The double marking effort would automatically yield an error/caution prompt on the user interface to demonstrate the error/violation.

When creating the event block illustrations in the user interface, a shading scheme and/or color scheme may be used, for example, a yellow colored block may indicate a free event, a red indicator may indicate an event in a particular line and/or something that is a violation. The same colors may be indicating a common "object". White spaces may indicate free entries. Blue spaces may indicate a trace entry, and a green space may be used to identify an ideal condition. As the violations occur, 'pop-up' identifiers may be used to demonstrate the violation automatically or via user 'scroll-over' actions to reveal the status of the space/block. The 'pop-up' may be used to identify a corresponding line in the text document (e.g., original data file). Blue lines may be used as markers to provide a tool to investigate how you get to a particular point. For example, if during a debug/troubleshoot operation, timestamps and recorded "blue line" paths may indicate a previous allocation space, date, time and/or assignment source.

Figure 1:
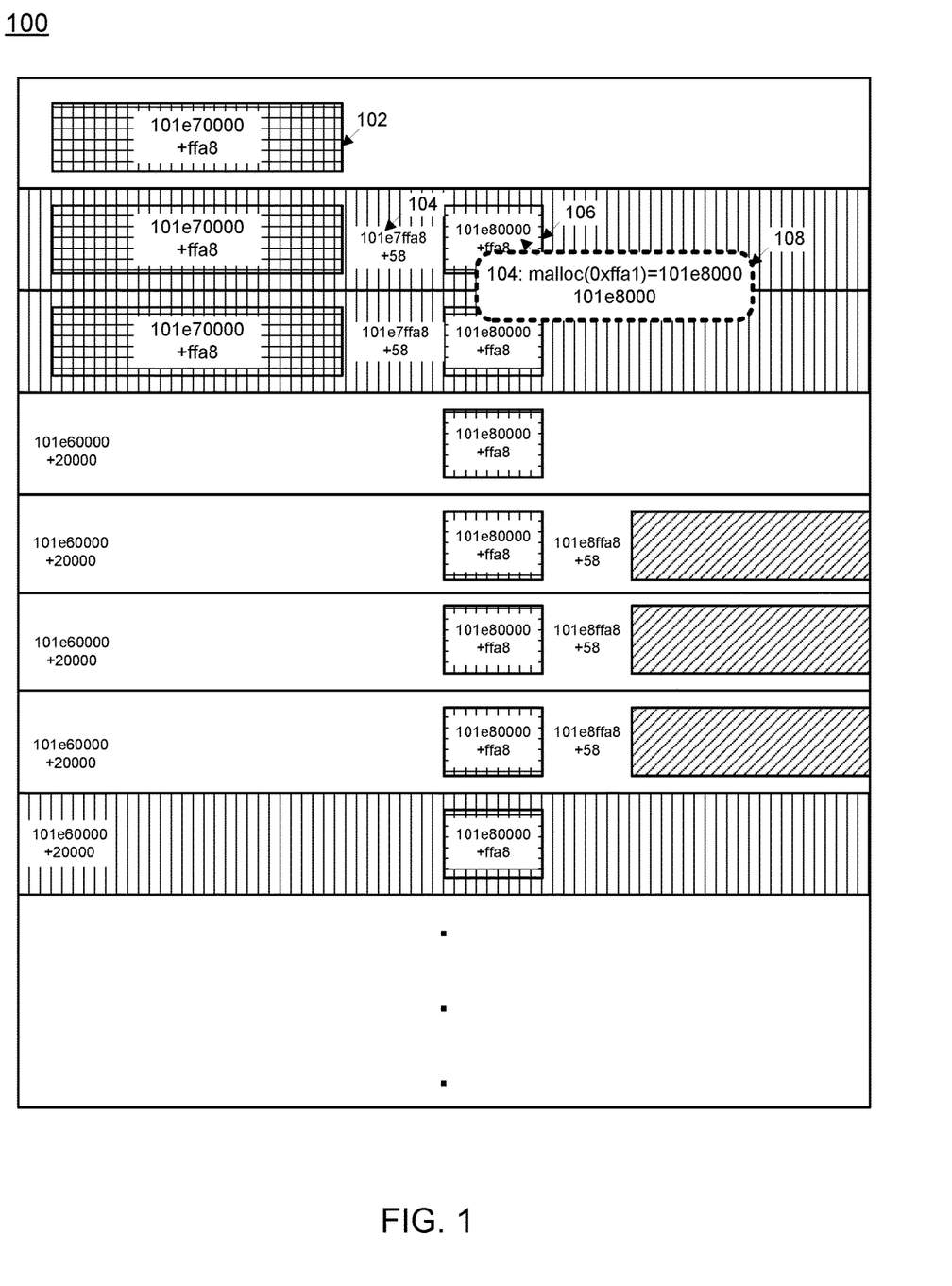
FIG. 1 illustrates an example of block allocation events being populated in a user interface according to example embodiments of the present application.

FIG. 1 illustrates an example of block allocation events populated in a user interface according to example embodiments of the present application. Referring to FIG. 1, the eight separate spaces indicate separate instances of memory allocation. In this example set of allocations 100, the allocation locations 102 are the same for the first three lines. An unallocated address 104 is identified prior to another allocation 106, which in this case, the notification window 108 indicates that the memory allocation is a particular size, and a particular address at line '104'. The notification windows can be used to demonstrate information about an allocation which is not readily apparent, is a likely error/invalid allocation, etc. The different shading patterns indicate different allocation groupings, for example, similar allocated blocks with similar shadings may be part of a common allocation group. Also, the spaces that are shaded differently may indicate lines which are free, full and/or have violations. In the actual interface of a computer display, different colors may instead by used.

Figure 2A:
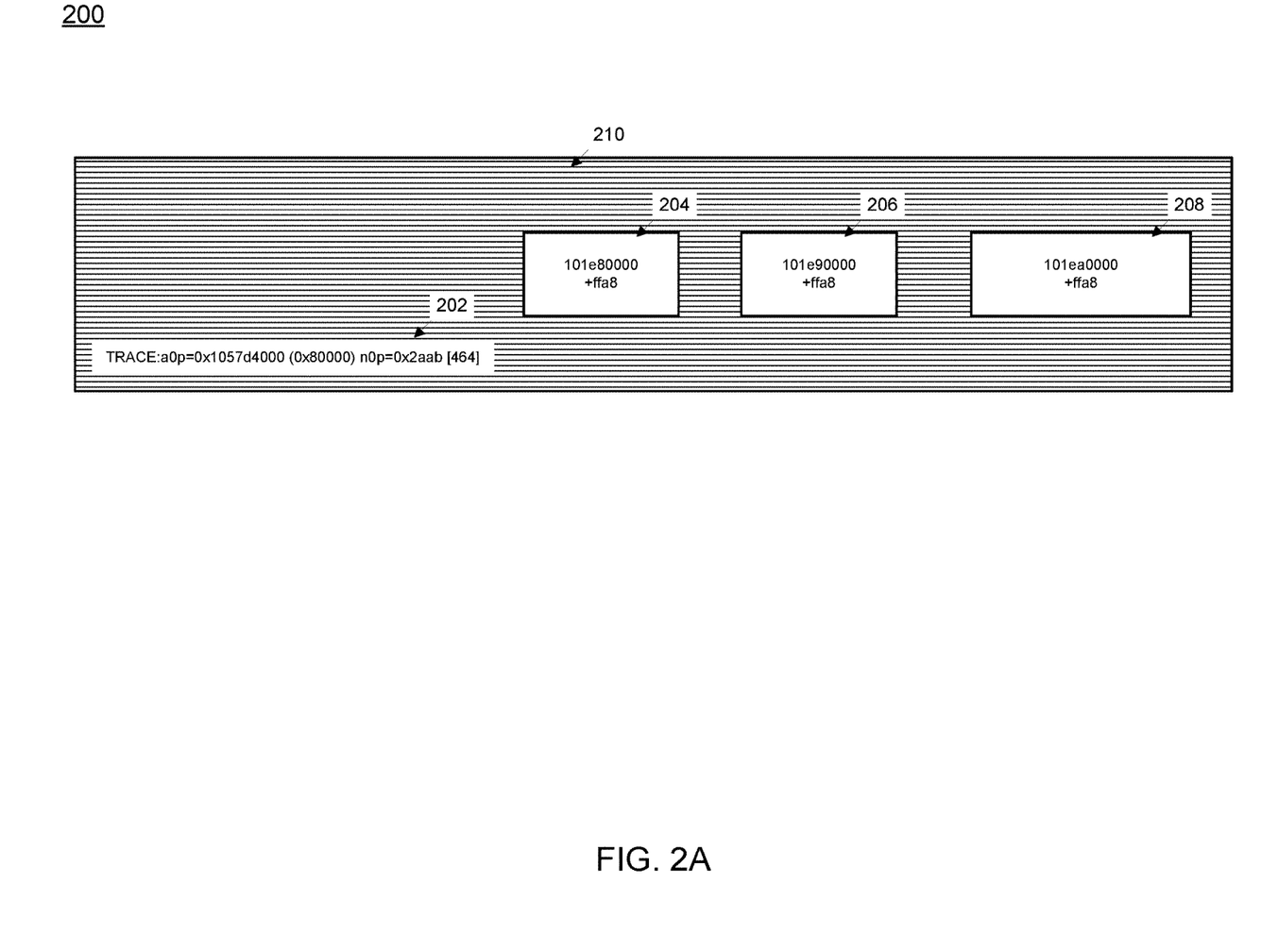
FIG. 2A illustrates an example trace entry example used to identify a target block in a user interface according to example embodiments of the present application.

FIG. 2A illustrates an example trace entry example used to identify a target block in a user interface according to example embodiments of the present application. Referring to FIG. 2A, the example 200 is a single line 210 that is identified as part of a trace entry that includes a marker to correlate with an execution path 202. The space includes separate allocations 204, 206 and 208, which may correlate to the same or separate allocation events. For example, as a process or application requires a set amount of memory, the allocated blocks may be identified to provide such memory, and as those blocks share a common allocation, they may be shaded or colored in the user interface in a common manner to indicate the association with a common application/process. This enables a user or automated action tool to identify the grouping of memory allocations and that they share a common source (i.e., application instance).

Figure 2B:
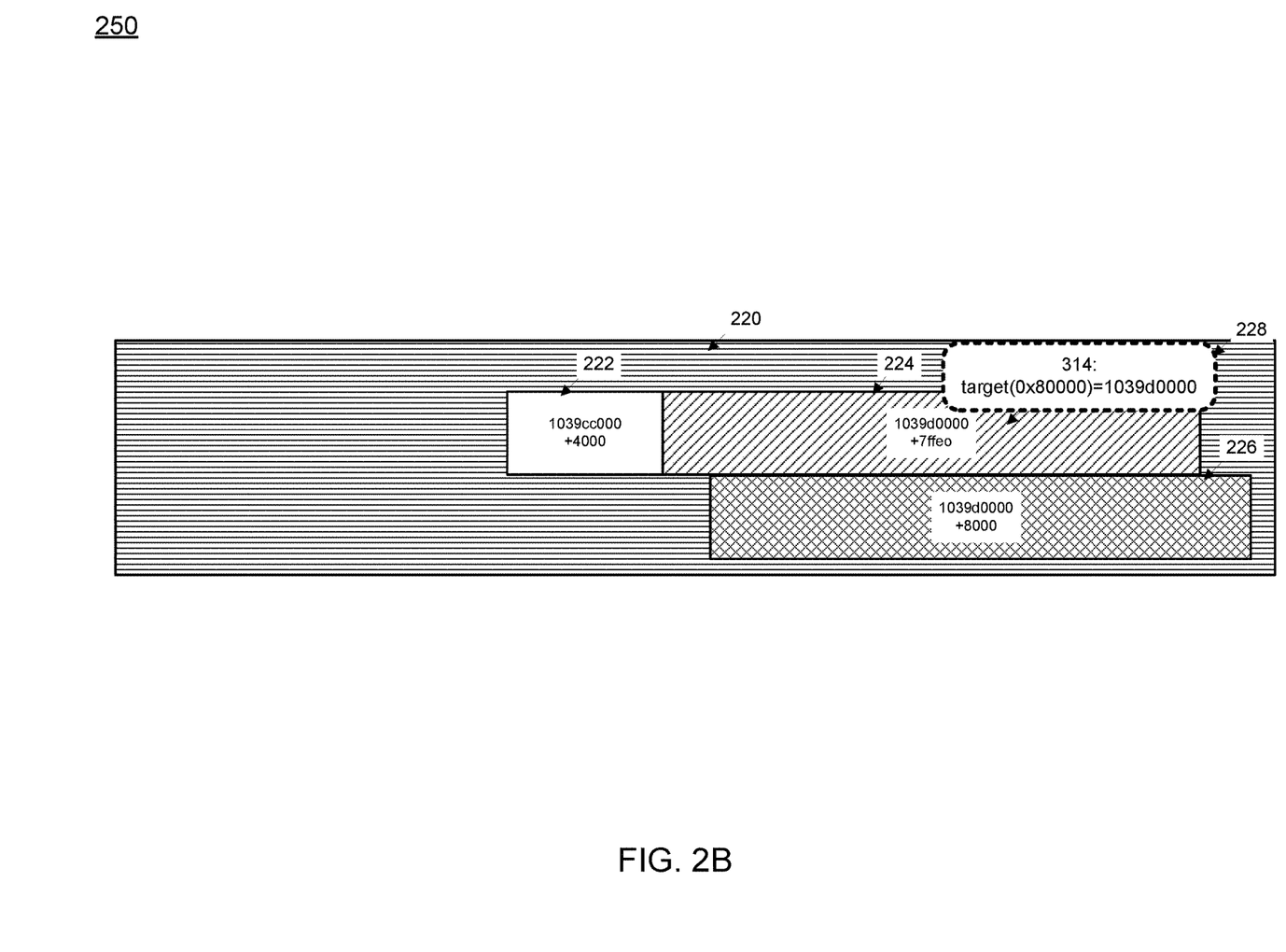
FIG. 2B illustrates an example of an identified target block illustrated in a user interface according to example embodiments of the present application.

FIG. 2B illustrates an example of an identified target block illustrated in a user interface according to example embodiments of the present application. Referring to FIG. 2B, the example 250 includes a target memory, which was identified as a potential location where a violation may occur and/or a location to perform memory allocation. The space 220 has memory allocations 222, 224 and 226. The target popup indicator 228 indicates the target address at line 314. In one example, an overlapping memory allocation may be based on state, such as 'allocated' vs. 'not-allocated', and whether the allocation occupies the same "space" which is the address, such as what's on the X-axis, and where the Y-axis is a passing of time events (sequential order of allocations).

Figure 3A:
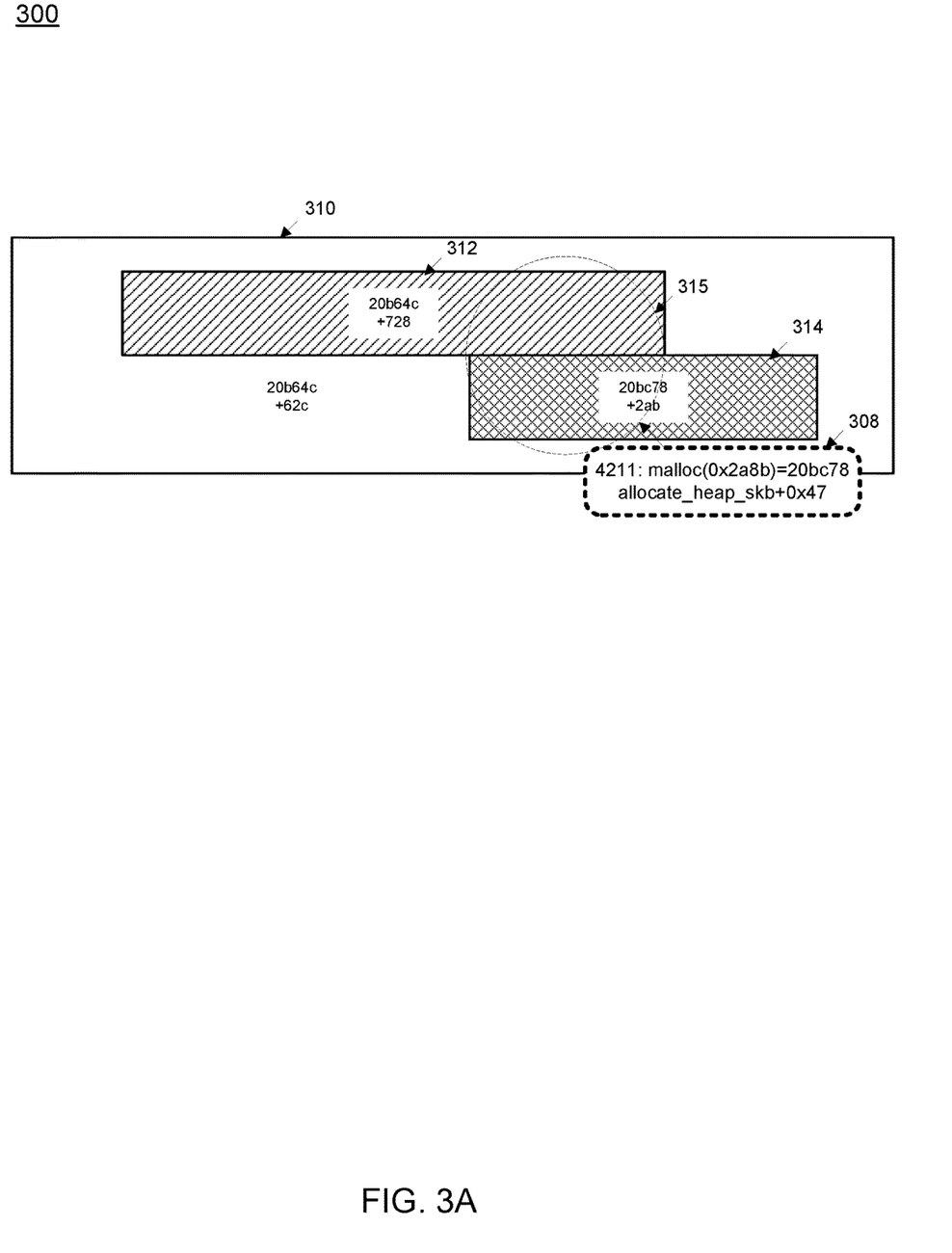
FIG. 3A illustrates an example of an identified allocation violation due to an overlapping entry assignment according to example embodiments of the present application.

FIG. 3A illustrates an example 300 of an identified allocation violation due to an overlapping entry assignment according to example embodiments of the present application. Under normal circumstances, allocations should not overlap. A proper allocation and illustration would include allocated blocks and some amount of blank space in-between the allocation blocks, which is considered free memory throughout the allocation space 310. However, due to various conditions (i.e., bugs or flaws) in the assignment implementation, blocks may be allocated that overlap with a previously allocated block (see overlapped region 315). This can cause errors when memory is used since one application may have been assigned to use that memory space, while another application attempts to write to that memory at a later time due to another allocation of a common memory space shared with the other application. In the example of FIG. 3A, a previously allocated block of size '0x728' was allocated at address 0x20b64c of block 312, at some later point in time (event-id '4211' of event identifier 308) an allocation of size x0x2a8 returned the value of 0x20bc78 for block 314. It is a unique value to two separate allocations, and thus from an address assignment perspective, it is not obvious that there is a problem with overlapped assignments of memory even though their allocations overlap and could cause errors. Different assignments may be overlapped assignments. The interface may have a feature that identifies overlapped condition and creates a red line, designates the area a violation, etc., to prompt the user to identify the violation. The automated features may identify the overlap by a shared/overlapped memory allocation block (i.e., 315), and create a command prompt that suggests a different destination reallocation space to correct the violation, and/or perform a reallocation to a new space, and provide a prompt/color change to demonstrate the identified overlapped violation, the reallocation and/or any other information required to correct the violation.

Using the interface allocation tool according to example embodiments, it is optimal to detect and visualize the violation(s) along with the correlation of two events that lead to such a violation. First, the generated graph can be scrolled and viewed with large amounts of allocations at any given time, on a display interface, until a row can be observed that has more than one entry, next, the interface may be scrolled horizontally until an overlapping entry is identified. By hovering over a highlighted entry (red entry) with an interface tool (i.e., a mouse or cursor tool), a bubble indicator may appear which would pop-up to identify the allocation event and the corresponding allocation site ("allocate_heap_skb" 308). The results of all overlapped conditions may be tallied in a list on the user interface, similar to a debug list of run time errors in a software compiler. The list may be executed autonomously via an autonomous error correction function that seeks to identify the target violations, identify destination re-allocation spaces, de-allocates the target allocations in violation, allocates new blocks at the destination locations, and creates a log to list the details of each deallocation/re-allocation operation, including time, date, address locations or origin and destinations, etc.

Figure 3B:
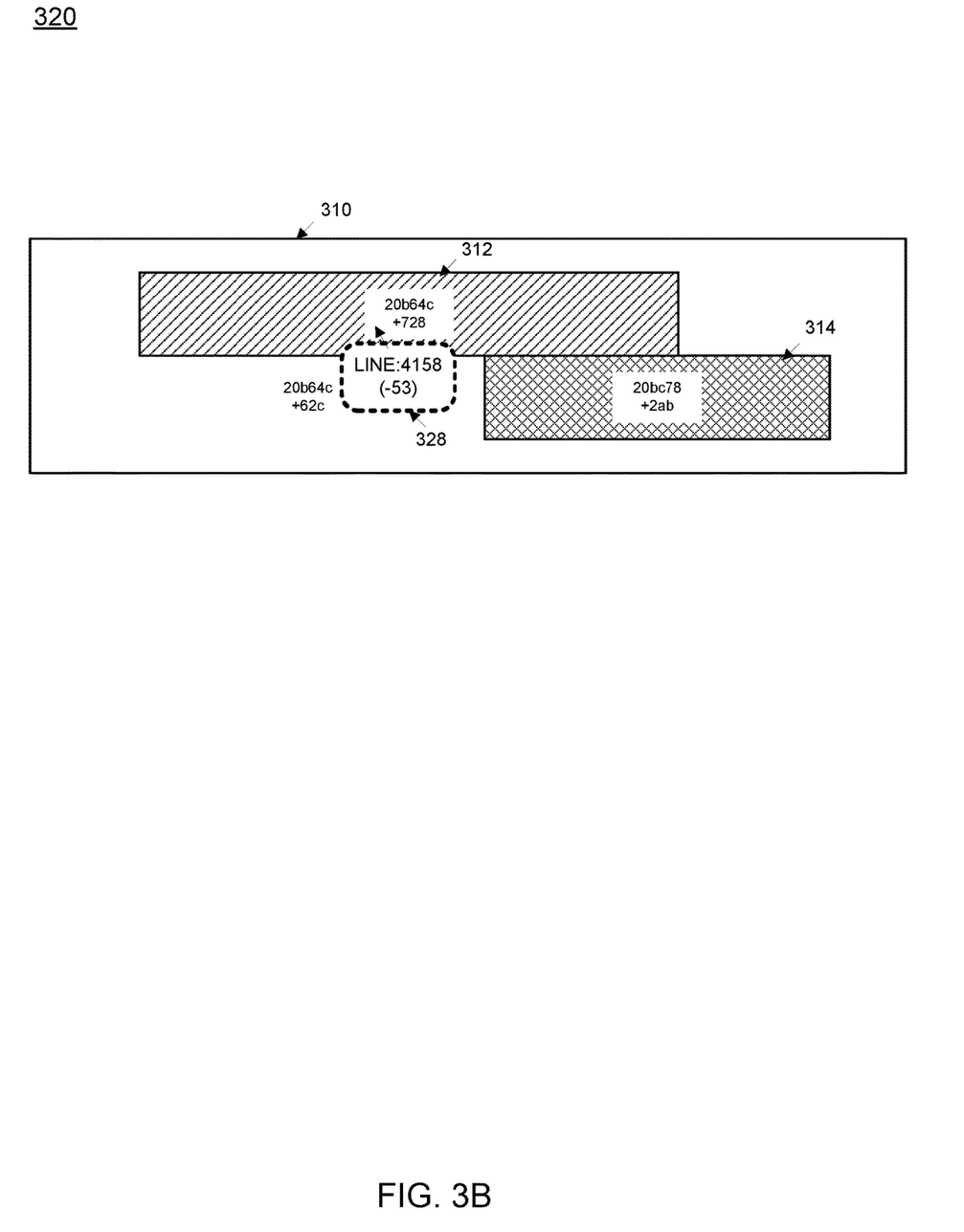
FIG. 3B illustrates an example of an identified allocation violation due to an overlapping entry assignment with additional entry event occurrence information according to example embodiments of the present application.

FIG. 3B illustrates an example of an identified allocation violation due to an overlapping entry assignment with additional entry event occurrence information according to example embodiments of the present application. Referring to FIG. 3B, the example 320 provides when hovering over the larger chunk of the overlapped allocation 312, a pop-up would appear 328 to illustrate that the allocation event occurred at line number 4158 and it happened 53 events prior to the current security violation being identified.

Figure 3C:
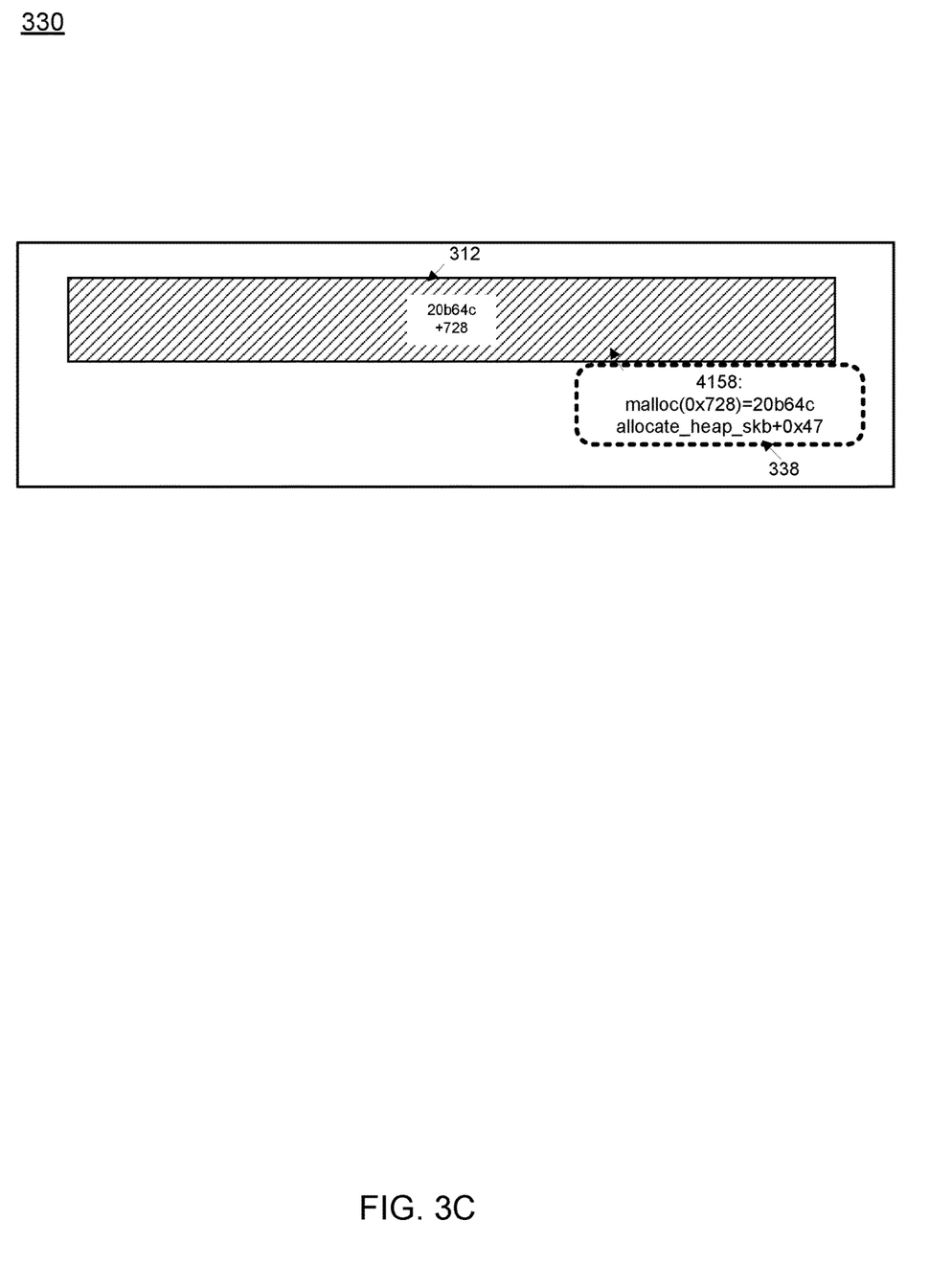
FIG. 3C illustrates an example of an identified allocation violation due to an overlapping entry assignment with additional entry event type information according to example embodiments of the present application.

FIG. 3C illustrates an example of an identified allocation violation due to an overlapping entry assignment with additional entry event type information according to example embodiments of the present application. Referring to FIG. 3C, the example 330 provides an instance of tracing an event backwards, to the original event, (at line 4158), as indicated by the display window 338 by hovering the access tool over the event 312, a pop-up indicates that it was a "malloc" event, and the allocation site is also "allocate_heap_skb." Using this allocation management tool, users can track and determine security violations and associated events, and thus increase a number of discovered event violations.

Figure 3D:
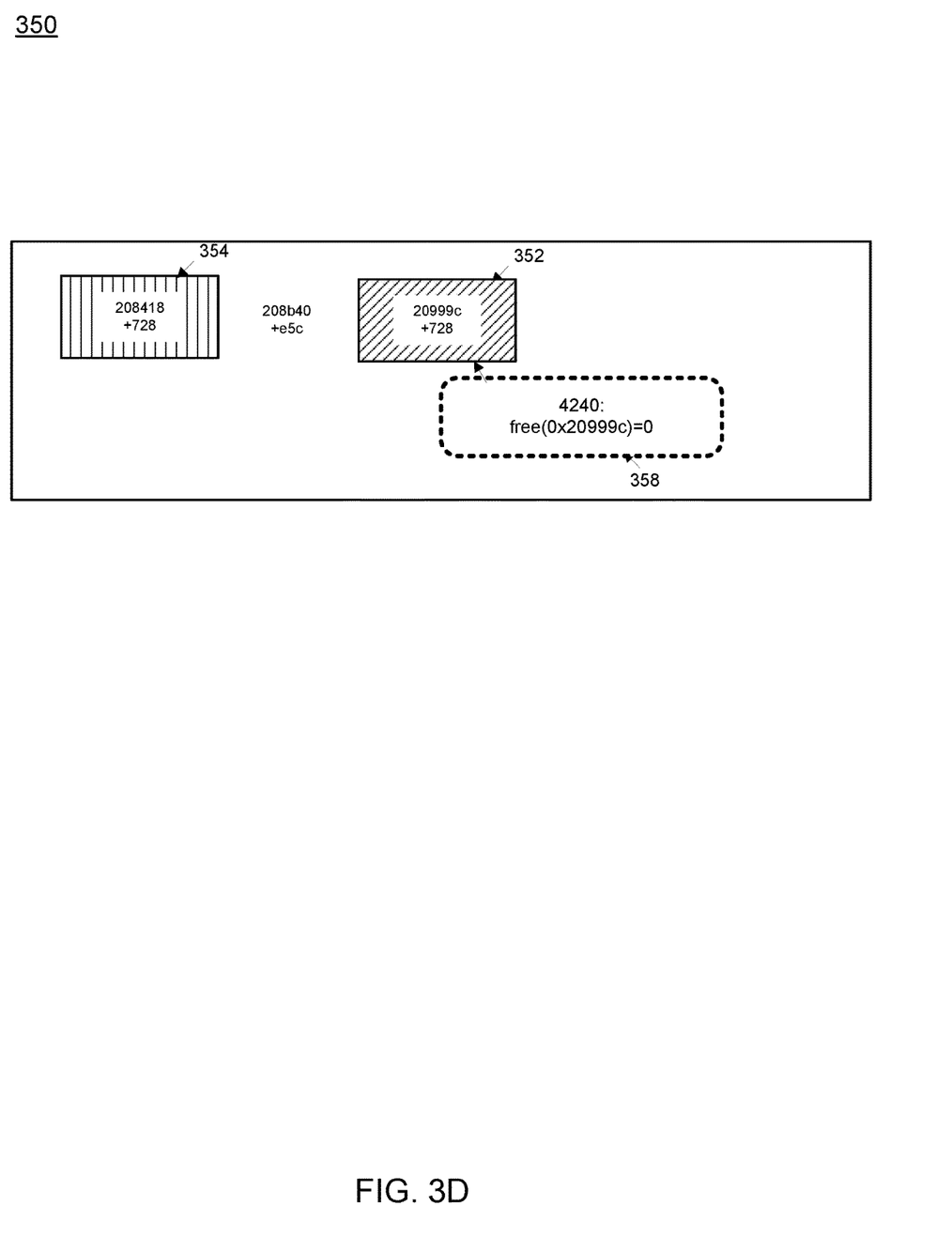
FIG. 3D illustrates an example of an identified allocation violation due to a double free assignment with additional entry event information according to example embodiments of the present application.

In addition to overlapped allocations as a violation, another security violation that often occurs is the "double free" violation, the detection of this condition is a class of exploitation referred to as "use after free". In this class of vulnerability the memory block is freed but there is still a reference stored somewhere, and thus, during a subsequent allocation, the block might be used with newly populated data from an unexpected source which, in turn, leads to memory corruption or in the worst case arbitrary code execution. In the example of FIG. 3D, a memory block at address 0x208b40 is freed. It is then coalesced into a large free block of size 0x1e84.

FIG. 3D illustrates an example of an identified allocation violation due to a double free assignment with additional entry event information according to example embodiments of the present application. Referring to FIG. 3D, the example provides two allocated memories 354 and 352. In the display interface, at line 4240, a free( ) event is called on address 0x20999c as indicated in reference display window 358 referencing allocation 352. This address is currently 'freed', thus a violation has occurred. This violation can be identified quickly by scrolling until a line with an error indication background is presented, (i.e., a red background) and then scrolling horizontally until we the event is identified. Again, hovering the cursor over the block causes a pop-up to indicate the event. Also, the cursor can be moved over the line above to display information associated with that event.

Figure 4:
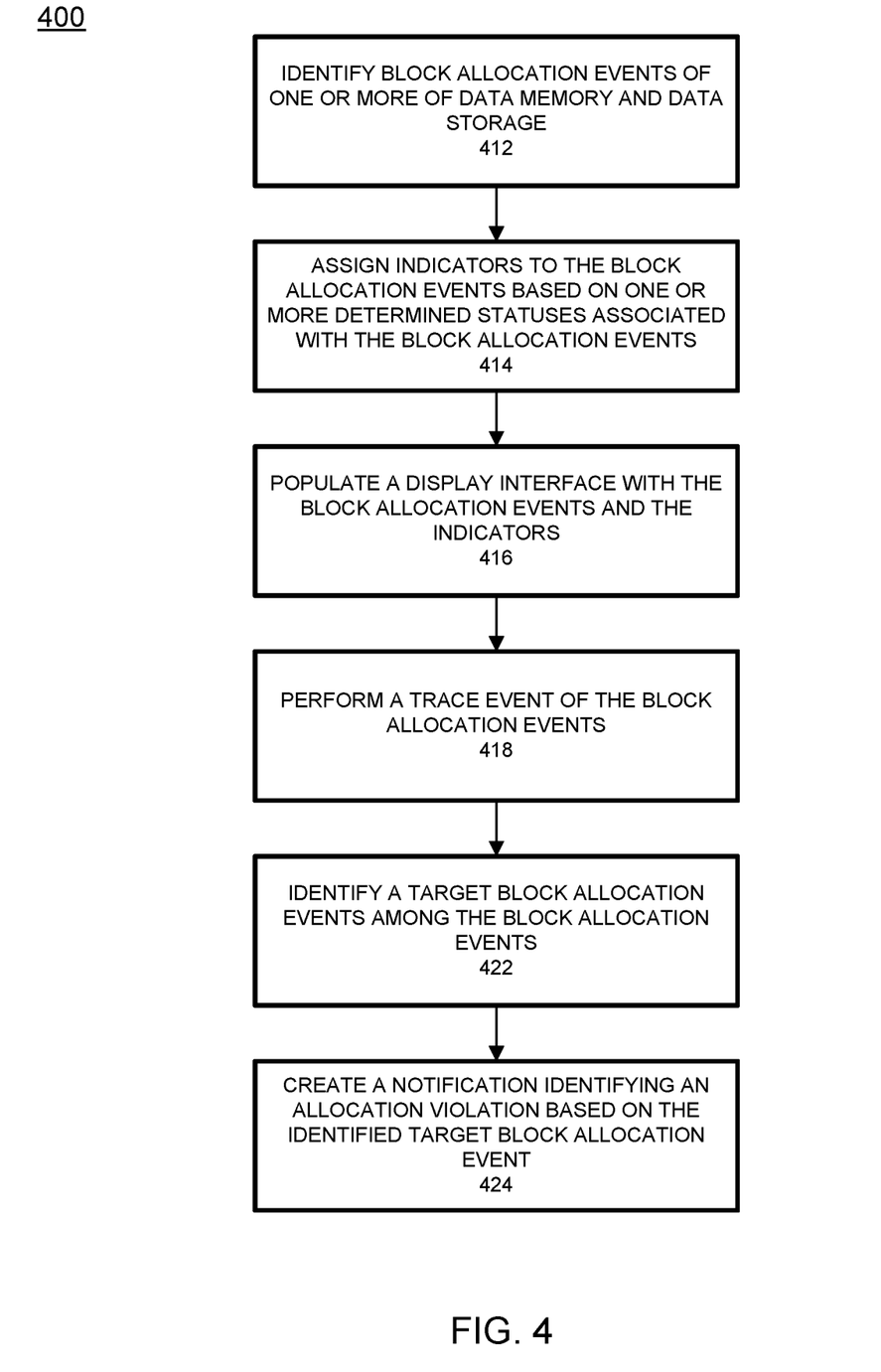
FIG. 4 illustrates a flow diagram of an example method of operation according to example embodiments of the present application.

FIG. 4 illustrates a flow diagram of an example method of operation according to example embodiments of the present application. Referring to FIG. 4, the method 400 may include identifying event block allocations of one or more of data memory and data storage allocations 412, assigning indicators to the event block allocations based one or more determined statuses associated with the event block allocations 414, populating a display interface with the event block allocations 416 and the indicators, performing a trace event of the event block allocations 418, identifying a target event block allocation among the event block allocations 422, creating a notification identifying an allocation violation based on the identified target event block allocation 424.

The method may also include performing a trace event of the event block allocations, and responsive to performing the trace event, determining the target event block allocation is a violation allocation. The method may also include identifying an available allocation destination address, de-allocating the target event block allocation, and re-allocating the target event block in the destination address as a new allocation. The method may also include logging the target allocation address, the target event block size, a date and time, and the destination address in a log file. The allocation violation may include one or more of an overlapped memory allocation and a double freed memory allocation. The event block allocations include allocations of both data memory and disk data storage. The method may also include after a predefined period of time, monitoring updated changes to event block allocations, identifying new event block allocation violations, and creating new notifications comprising the address locations of the new event block allocation violations.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

Figure 5:
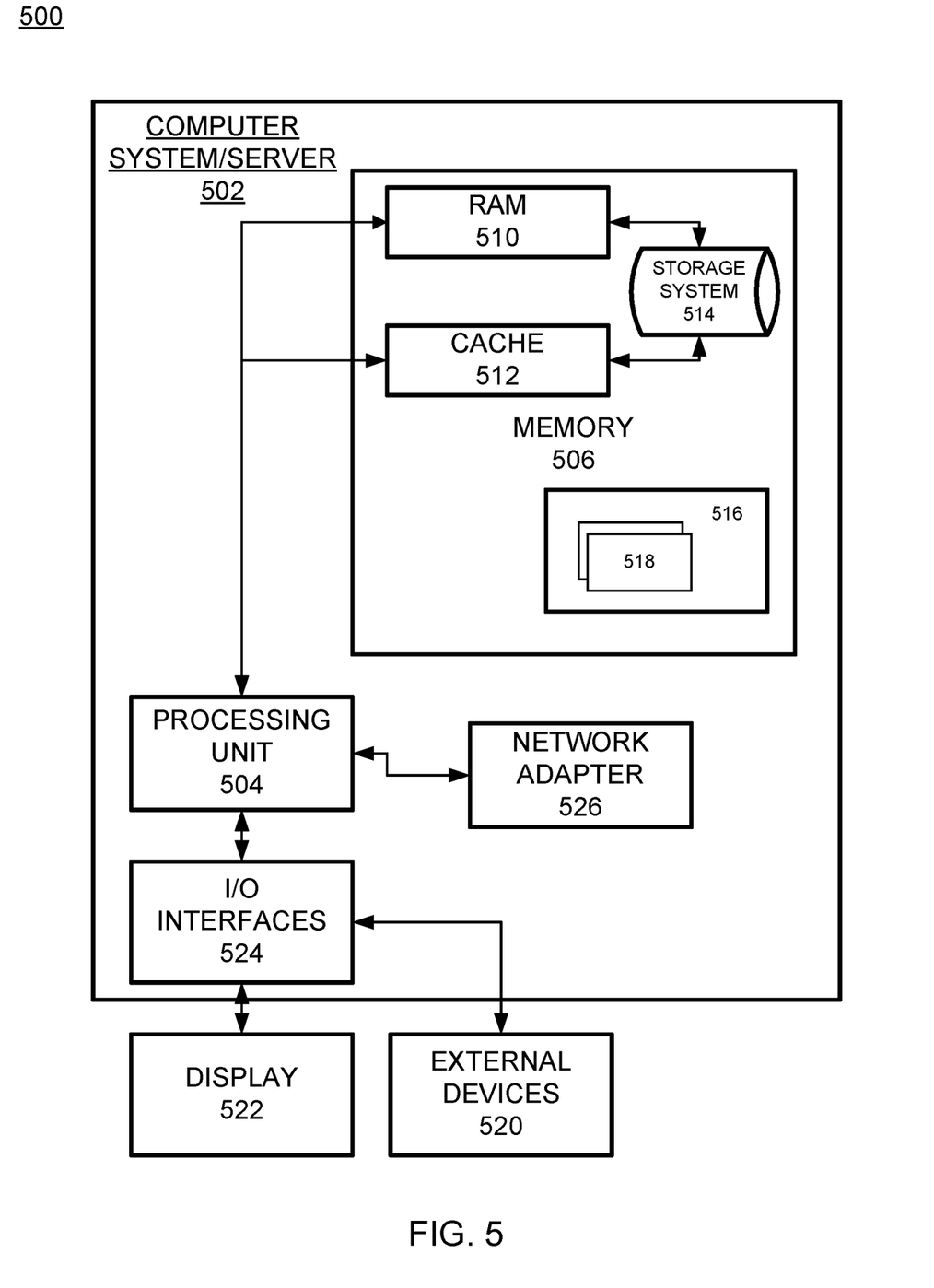
FIG. 5 illustrates a computer processing entity which is intended to promote the computational procedures and related operations of the example embodiments of the present application.

FIG. 5 is not intended to suggest any limitation as to the scope of use or functionality of embodiments of the application described herein. Regardless, the computing node 500 is capable of being implemented and/or performing any of the functionality set forth hereinabove.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units 504, a system memory 506, and a bus that couples various system components including system memory 506 to processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random-access memory (RAM) 510 and/or cache memory 812. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506, by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

Those skilled in the art will understand that there can be many variations made to the operations of the user interface explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

What is claimed is:

1. A method comprising:
identifying event block allocations of a plurality of data memory allocations from a log file of the data memory allocations;
assigning indicators to the event block allocations based one or more statuses associated with the event block allocations;
populating a display interface with the event block allocations and the assigned indicators;
identifying a target event block allocation among the event block allocations;
performing a trace event based on the target event block allocation and at least one other event block allocation;
creating a notification identifying an allocation violation based on an overlapped memory allocation of the identified target event block allocation and the at least one other event block allocation having a starting address different than the target event block allocation; and
rendering, on the display interface, an overlapped region based on the target event block allocation and the at least one other event block allocation.

2. The method of claim 1, further comprising:
identifying an available allocation destination address;
de-allocating the target event block allocation; and
re-allocating the target event block in the destination address as a new allocation.

3. The method of claim 2, further comprising:
logging the target allocation address, the target event block size, a date and time, and the destination address in a log file.

4. The method of claim 1, wherein the allocation violation further comprises a double freed memory allocation.

5. The method of claim 1, wherein the event block allocations comprise allocations of both data memory and disk data storage.

6. The method of claim 1, further comprising:
after a predefined period of time, monitoring updated changes to event block allocations;
identifying new event block allocation violations; and
creating new notifications comprising the address locations of the new event block allocation violations.

7. The method of claim 1, wherein the event block allocations correspond to memory allocation instructions.

8. The method of claim 1 wherein the allocation violations are based on attempts to designate availability of a region of memory based on a block of addresses.

9. The method of claim 1 wherein a size of the memory referenced by an event block allocation is based on a compiler.

10. The method of claim 1 wherein the event block allocation and the overlapped memory allocation designates allocation of a common memory space between the identified event block allocation and the target event block allocation.

11. The method of claim 1 wherein the identified event block allocation and the target event block allocation have different allocation addresses.

12. An apparatus comprising:
a processor configured to:
identify event block allocations of data memory allocations from a log file of the data memory allocations;
assign indicators to the event block allocations based one or more statuses associated with the event block allocations;
populate a display interface with the event block allocations and the assigned indicators;
identify a target event block allocation among the event block allocations;
perform a trace event based on the target event block allocation and at least one other event block allocation;
a transmitter configured to transmit a notification identifying an allocation violation based on an overlapped memory allocation of the identified target event block allocation and the at least one other event block allocation having a starting address different than the target event block allocation to an administrator device; and a display interface configured to render an overlapped region based on the target event block allocation and the at least one other event block allocation.

13. The apparatus of claim 12, wherein the processor is further configured to:
    identify an available allocation destination address;
    de-allocate the target event block allocation; and
    re-allocate the target event block in the destination address as a new allocation.

14. The apparatus of claim 13, wherein the processor is further configured to log the target allocation address, the target event block size, a date and time, and the destination address in a log file.

15. The apparatus of claim 12, wherein the allocation violation further comprises a double freed memory allocation.

16. The apparatus of claim 12, wherein the event block allocations comprise allocations of both data memory and disk data storage.

17. The apparatus of claim 12, wherein the processor is configured to
    after a predefined period of time, monitor updated changes to event block allocations;
    identify new event block allocation violations; and
    create new notifications comprising the address locations of the new event block allocation violations.

18. A non-transitory computer readable storage medium having instructions that, when executed by a processor, perform a method comprising:
    identifying event block allocations of a plurality of data memory allocations from a log file of the data memory allocations;
    assigning indicators to the event block allocations based one or more statuses associated with the event block allocations;
    populating a display interface with the event block allocations and the assigned indicators;
    identifying a target event block allocation among the event block allocations;
    performing a trace event based on the target event block allocation and at least one other event block allocation;
    creating a notification identifying an allocation violation based on an overlapped memory allocation of the identified target event block allocation and the at least one other event block allocation having a starting address different than the target event block allocation; and
    rendering, on the display interface, an overlapped region based on the target event block allocation and the at least one other event block allocation.

19. The non-transitory computer readable storage medium of claim 18 wherein the processor is further configured to perform:
    identifying an available allocation destination address;
    de-allocating the target event block allocation; and
    re-allocating the target event block in the destination address as a new allocation.

20. The non-transitory computer readable storage medium of claim 19, wherein the processor is further configured to perform:
    logging the target allocation address, the target event block size, a date and time, and the destination address in a log file.

21. The non-transitory computer readable storage medium of claim 18, wherein the allocation violation further comprises a double freed memory allocation, and wherein the event block allocations comprise allocations of both data memory and disk data storage.

22. The non-transitory computer readable storage medium of claim 18, wherein the processor is further configured to perform:
    after a predefined period of time, monitoring updated changes to event block allocations;
    identifying new event block allocation violations; and
    creating new notifications comprising the address locations of the new event block allocation violations.

* * * * *